(12) United States Patent
Bouchat et al.

(10) Patent No.: US 8,880,655 B2
(45) Date of Patent: Nov. 4, 2014

(54) CONFIGURATION OF DEVICE AT A CUSTOMER PREMISES EQUIPMENT AND RELATED METHOD

(75) Inventors: Christele Bouchat, Antwerp (BE); Willem Jozef Amaat Acke, Rijmenam (BE)

(73) Assignee: Alcatel Lucent, Boulogne-Billancourt (FR)

( * ) Notice: Subject to any disclaimer, the term of this patent is extended or adjusted under 35 U.S.C. 154(b) by 1572 days.

(21) Appl. No.: 11/943,395

(22) Filed: Nov. 20, 2007

(65) Prior Publication Data

US 2008/0133717 A1 Jun. 5, 2008

(30) Foreign Application Priority Data

Nov. 30, 2006 (EP) .................................... 06291862

(51) Int. Cl.
| | |
|---|---|
| *G06F 15/177* | (2006.01) |
| *H04Q 3/00* | (2006.01) |
| *G06F 9/44* | (2006.01) |
| *G06F 3/12* | (2006.01) |
| *H04L 12/24* | (2006.01) |

(52) U.S. Cl.
CPC ............ *H04Q 3/0062* (2013.01); *G06F 9/4411* (2013.01); *G06F 3/1254* (2013.01); *H04L 41/046* (2013.01); *H04L 41/0816* (2013.01); *H04L 41/0886* (2013.01); *H04L 41/5003* (2013.01); *H04L 41/5022* (2013.01); *H04L 41/5054* (2013.01); *H04L 41/509* (2013.01)
USPC ............... 709/220; 709/221; 709/222; 713/1; 713/100; 713/2; 717/177; 717/178

(58) Field of Classification Search
CPC ... G06F 15/177; G06F 9/4411; G06F 3/1254; G06F 9/44505; G06F 12/0646; G06F 15/7871; H04L 29/06; H04L 12/2426
USPC ........... 709/220, 221; 713/1, 100, 2; 717/177, 717/178
See application file for complete search history.

(56) References Cited

U.S. PATENT DOCUMENTS

| 6,584,074 B1 * | 6/2003 | Vasamsetti et al. ............ 370/254 |
| 7,526,762 B1 * | 4/2009 | Astala et al. ................... 717/171 |

(Continued)

FOREIGN PATENT DOCUMENTS

| EP | 1667359 A | 6/2006 |
| WO | WO 2005/117389 A1 | 12/2005 |

OTHER PUBLICATIONS

Berstein et al., "Applying TR-069 to Remote Management of Home Networking Devices", TR-111, 2005.*

(Continued)

*Primary Examiner* — O. C. Vostal
(74) *Attorney, Agent, or Firm* — Harness, Dickey & Pierce

(57) ABSTRACT

A device at a Customer Premises Equipment that comprising Device Dependent Services that are to be configured by a remote Auto-Configuration Server is claimed. The device comprises also Device Independent Services on top of a Service Platform (SPLF). The device is hereby adapted to be configured by a plurality of Auto-Configuration Servers and comprises therefore a Native Service Management being one of the Device Independent Services. This Native Service Management comprises furthermore a receiver part to receive device dependent service information of the Device Dependent Services and a splitter part to split the device dependent service information into different parts, and to transmit each part to a distinct Device Independent Service. Each distinct Device Independent Services being coupled via a common Management Agent being one of the Device Independent Services, to one of the plurality of Auto-Configuration Servers, whereby only the respective part of the Device Dependent Services that is associated to the device dependent service information that is forwarded to the associated Device Independent Service is configured by the associated Auto-configuration Server (FIGURE).

2 Claims, 1 Drawing Sheet

(56) References Cited

U.S. PATENT DOCUMENTS

| | | | |
|---|---|---|---|
| 7,770,200 B2* | 8/2010 | Brooks et al. | 725/95 |
| 7,983,179 B2* | 7/2011 | Jiang et al. | 370/250 |
| 8,285,818 B2* | 10/2012 | Grannan et al. | 709/219 |
| 2004/0252703 A1* | 12/2004 | Bullman et al. | 370/395.52 |
| 2005/0193388 A1* | 9/2005 | Hayes, Jr. | 717/174 |
| 2005/0203891 A1* | 9/2005 | Broadhurst et al. | 707/3 |
| 2005/0283810 A1* | 12/2005 | Ellis et al. | 725/93 |
| 2006/0075118 A1* | 4/2006 | Roelens et al. | 709/227 |
| 2006/0120305 A1* | 6/2006 | Van Den Bosch et al. | 370/254 |
| 2007/0198664 A1* | 8/2007 | Satkunanathan et al. | 709/220 |
| 2007/0288247 A1* | 12/2007 | Mackay | 705/1 |
| 2009/0064268 A1* | 3/2009 | Straub et al. | 725/152 |
| 2009/0116178 A1* | 5/2009 | Champion et al. | 361/624 |
| 2009/0201830 A1* | 8/2009 | Angelot et al. | 370/254 |

OTHER PUBLICATIONS

Bernstein et al., DSL Home Data Model Template for TR-069-Enabled Devices, TR-106, 2005.*

Berstein et al., "DSL Home Internet Gateway Device Version 1.1 Data Model for TR-069", TR-098, 2005.*

Bathrick et al., "CPE WAN Management Protocol v 1.1", Nov. 2006, "TR-069 Amendment 1".*

Bathrick et al., "DSL Home Data Model Template for TR-069-Enabled Devices", Sep. 2005, "DSL Forum TR-106".*

Takizawa et al., "Future Service Platform and Home Gateway", 2005.*

DSL Home-Technical Working Group: "CPE WAN Management Protocol" Technical Report DSL Forum TR-069, May 2004, XP002316355.

Search Report for corresponding European Application No. 06 291 862.8 dated Sep. 9, 2010.

Motoyuki Takizawa et al., "Future Service Platform and Home Gateway," Conference: Asia-Pacific Symposium on Information and Telecommunication Technologies—APSITT, 2005.

* cited by examiner

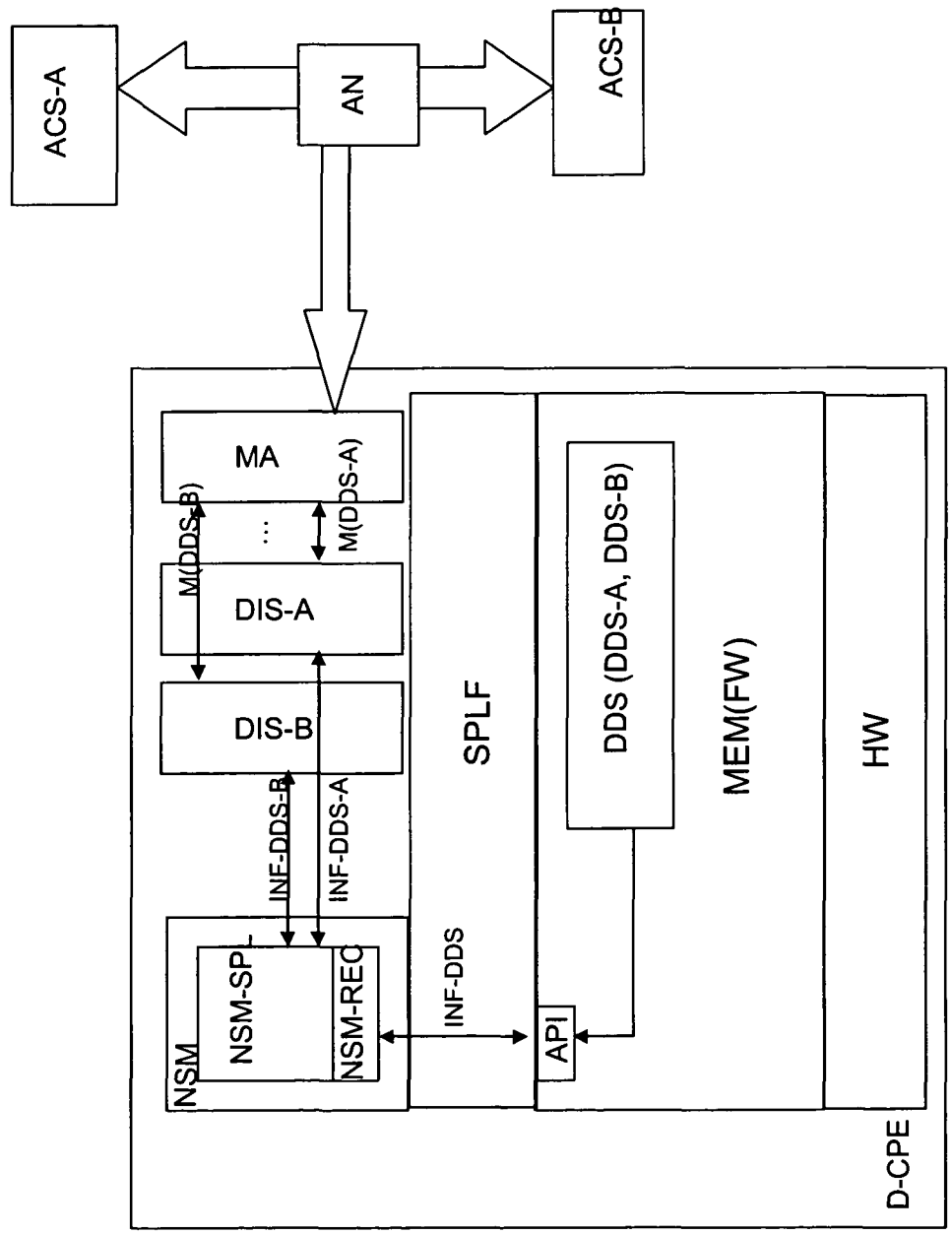

CONFIGURATION OF DEVICE AT A CUSTOMER PREMISES EQUIPMENT AND RELATED METHOD

The present invention relates to a method to configure Device Dependent Services and to a device that executes the method.

Such a method to configure Device dependent services is already known in the art.

Indeed, mass home network deployment requires remote configuration of the Customer Premises Equipment by a Customer Premises configuration Server, also called Automatic configuration Server, called hereafter shortly ACS, in order to reduce the operator OPEX caused by help desk calls. The DSL-Forum has defined the Customer Premises Equipment Wide Area Network Management Protocol, shortly called WAN Management Protocol in the Technical Report TR-069. In this TR-069 Technical Report, the remote configuration and management is today defined as being done by one ACS only, which is a huge limitation in terms of business model.

Adapting the Technical Report TR-069 to support management of Customer Premises Equipment by multiple ACS's simultaneously would require significant changes to this protocol and would create problems of backward compatibility with existing deployments.

An alternative solution would be to pass through a Northbound interface of an ACS. Such a master ACS plays then the role of a proxy for a slave ACS. However, such a specific northbound interface would have a lot of limitations. One of these limitations becomes clear in the example when hereby an end-user X has to choose between a Service Provider SP-A and another Service Provider SP-B for his services. When this user X chooses the first Service Provider SP-A for its basic service offering e.g. connectivity, firewall settings, ..., while this user X wants the other Service Provider SP-B to offer him with an advanced service such as e.g. IPTV for example. In the assumption of a master ACS, it means that the second Service Provider SP-B would have to contact the ACS of the Service Provider SP-A and asks it to make some configuration for itself. It also means that SP-A is now aware that end user X has selected SP-B for an advanced service that he could provide himself. There is here clearly a lack of confidentiality that could negatively affect both Service Providers: SP-B can loss a client and needs to proxy information to SP-A; and SP-A can try to regain its customer for this advanced service.

It has to be explained that the ACS is today managing device dependent parameters, also called Native Parameters of the device dependent services, called Native Services. These Native Parameters are supported by the firmware of the CPE device. The ACS can employ the Native Services and configure the Native Parameters through an interface of the CPE device. Examples of these Native Services are firewalls, Network Address Translation, support for Quality of Service such as traffic classification and queuing, etc.

When the device has a service platform, another entity is managing the device independent services on top of this service platform, also called bundles.

It has to be explained that a service platform i.e. a Framework for Service Management can be implemented by means of e.g. OSGi running on a Java Virtual Machine or e.g. by a service platform created on top of .NET or e.g. a service platform build on top of Linux, etc.

The device independent services, bundles, are applications that do not depend on device specific features, but only rely on the features offered by the service platform. As such, bundles can be e.g. end-users applications or they can be services that are not device dependent such as e.g. QoS monitoring of the home network).

Furthermore it has to be explained that such bundles have certain properties. By exporting a service interface to a predefined service platform's service registry, other bundles can act upon a particular bundle, and thus change the bundles properties. With the existing technology, one can control exported services. Hereby, services registered in the service registry are only visible to certain bundles and not to others.

Indeed, each service platform has a service registry. A first bundle firstly registers at the service registry the fact that it has a first interface available. This means that another second bundle can find in this service registry this fact i.e. the first bundle made a first interface available to other bundles. Hereby the second bundle can also use this first interface. However, in addition, the first bundle can register at the service registry also the fact that it only makes this first interface available to some predefined other bundles. Hereby, the second bundle can only use the first interface in the event when the first bundle explicitly made available the first interface for the second bundle i.e. the first bundle exported his first interface for the second bundle. In this way, on the service registry, a service interface can be opened i.e. exported for use by another bundle.

In this way, a device at a Customer Premises Equipment comprises Device Dependent Services that can be configured by a remote Auto-Configuration Server. The device further comprises also Device Independent Services on top of a Service Platform that are called bundles.

Such a device has however the drawback, as described above, of not being properly adapted to be auto-configured, simultaneously, by more then one auto-configuration server.

An object of the present invention is to provide a method and a device such as the above known type, but which supports of being configured simultaneously by more then one auto-configuration server without providing conflicts between the different auto-configuration servers and without having to provide backward compatibilities with the existing deployments.

According to the invention, this object is achieved due to the fact that the management of device dependent parameters is linked to a specific bundle's service interface on the service platform. This specific bundle, called Native Services Management provides access towards the management of dedicated native service bundles and makes some parameters visible to e.g. only Service Provider A or it makes some parameters visible to only Service Provider B. The parameters that are made visible to one or to the other Service Provider is depending on the services and service providers that are chosen by the end-users.

Indeed, the Management Agent terminates the remote management protocol sessions from SP-A and SP-B. It makes sure that each of these sessions can only interact with its own bundle, called device independent services DIS-A for service provider SP-A, and device independent services DIS-B for service provider B.

In this way, since the Native Services Management-bundle only makes the parameters visible for each service provider in their own bundle, and the Management Agent makes sure that each of the remote management sessions can only interact with its own bundle, this effectively makes remote management of Customer Premises Equipment by multiple ACS's simultaneously possible, without changing the TR-069 protocol.

So, the device is adapted to be configured by a plurality of Auto-Configuration Servers and comprises therefore a Native Service Management being one of the Device Independent Services. And the Native Service Management comprises hereby a receiver part to receive device dependent service information of the Device Dependent Services; and a splitter part to split the device dependent service information into different parts, and to make each part visible to a distinct Device Independent Service bundle. Furthermore, each distinct Device Independent Service is hereby coupled via a common Management Agent, which is one of the Device Independent Services, towards one of the plurality of Auto-Configuration Servers. Hereby only the respective part of the Device Dependent Services that is associated to the device dependent service information and that is forwarded to the associated Device Independent Service bundle is configured by the associated Auto-configuration Server.

The Native Services Management enables remote management of the Device by different ACS's. Hereby multi-service provider management access is enabled. Indeed, each service provider such as Service Provider A and/or Service Provider B can configure his own set of native device dependent parameters in addition to the already available configuration of device independent service parameters.

It is to be noticed that the term 'comprising', used in the claims, should not be interpreted as being limitative to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being limitative to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

The above and other objects and features of the invention will become more apparent and the invention itself will be best understood by referring to the following description of an embodiment taken in conjunction with the accompanying drawings wherein the FIGURE represents a device of customer Premises Equipment D-CPE in an Access Communication network.

The working of the device according to the present invention in accordance with its telecommunication environment that is shown in the FIGURE and will be explained by means of a functional description of the different blocks shown therein. Based on this description, the practical implementation of the blocks will be obvious to a person skilled in the art and will therefore not be described in details. In addition, the principle working of the method to configure device dependent services will be described in further detail.

The FIGURE shows an Access Node AN that is coupled to the Device at a Customer Premises Equipment D-CPE and to two Auto configuration Servers ACS-A and ACS-B. The Auto-configuration server ACS-A is included to configure predetermined parameters of the device D-CPE which are relevant to a Service Provider A (not shown); and Auto-configuration server ACS-B is included to configure predetermined parameters of the device D-CPE which are relevant to Service Provider B (not show).

The device D-CPE comprises Hardware HW being the basic functional blocks of the device; and a memory MEM that comprises the Firmware MEM(FW) being embedded in the hardware HW. The Memory can be implemented by a flash ROMs or as a binary image file that can be uploaded onto other parts of the hardware HW.

The Device Dependent Services DDS is a functional block being part of the Framework FW that executes the Native Services by means of setting predefined parameters to predefined values. As a matter of example, the device dependent services functional block DDS comprises two parts DDS-A and DD-B. The DDS-A part is the part of the device dependent services DDS that is related to predefined services which must be configured by Service provider A via the auto configuration server ACS-A. The DDS-B part is the part of the device dependent services DDS that is related to predefined services which must be configured by Service provider B via the auto configuration server ACS-B.

The device D-CPE further comprises a Service Platform SPLF that provides the device Framework for a service platform such as described above.

In order to access the device dependent services DDS, an Application Programming Interface API is included. Via this API interface the set of relevant parameters can be programmed with its respective value. Hereby the device dependent services or part of it is installed, reinstalled, activated or deactivated etc Via the Application Programming interface the device dependent service parameters can be exported on top of the Service Platform (SPLF) of the device D-CPE.

The device D-CPE also comprises Device Independent Services DIS that are included to execute device independent services such as described above. These Device Independent Services are also called bundles. Each bundle executes its particular dedicated function.

In this way a Device Independent Services-functional block is shown called DIS-A. This is a bundle that implements the functions that are directed to the configuration of the configuration parameters that are relevant for device Dependent Services part A i.e. DDS-A and that ought to be configured by the Auto configuration server ACS-A.

Furthermore, also a Device Independent Services-functional block is shown called DIS-B. This is a bundle that implements the functions that are directed to the configuration of the configuration parameters that are relevant for device Dependent Services part B i.e. DDS-A and that ought to be configured by the Auto configuration server ACS-B.

Also the Native Service Management NSM is a Device Dependent Services-functional block and will be further explained in a further paragraph.

Finally the Management Agent MA is also a Device dependent services-functional block that executes e.g. the known function of terminating the applicable protocol such as e.g. TR-069 and that further forwards the dedicated messages towards e.g. DIS-A or DIS-B.

Device dependent service information INF-DDS is exported by the device dependent services DDS via the Application Programming Interface API on top of the Service Platform SPLF towards the Native Service Management NSM. The receiver part of the Native Service Management NSM-REC receives this Device dependent service information INF-DDS.

It has to be remarked that this device dependent service information INF-DDS comprises inherently different parts e.g. the device dependent service information being relevant for service provider A, called INF-DDS-A; and the device dependent service information being relevant for service provider B, called INF-DDS-B.

The Native Service Management NSM is included to split the device dependent service information INF-DDS into these two parts i.e. INF-DDS-A and INF-DDS-B. This is done by the splitter part of the Native Service Management NSM-SPL. Hereafter the splitter part NSM-SPL makes visible a first part INF-DDS-A to the Device Independent Service DIS-A; and a second part INF-DDS-B to the Device Independent Services DIS-B.

Each device independent services, DIS-A and DIS-B makes this information available to the Management Agent MA by exporting a service interface i.e. DIS-A exports a service interface M(DDS-A) comprising only information related to the associated respective part (DDS-A) of DDS, and DIS-B exports a service interface M(DDS-B) comprising only information related to the associated respective part (DDS-B) of DDS.

Indeed, NSM-SPL exports two service interfaces to the service registry, a first being comprised in INF-DDS-A, and a second being comprised in INF-DDS-B. The two service interfaces are registered in the registry whereby, according to the above described mechanism, NSM-SPL specifies that INF-DDS-A is only made available to DIS A, and INF-DDS-B is only made available to DIS-B. This means that also in the other direction, Bundle DIS-A can only find information at the Service registry being related to INF-DDS-A, and can consequently only use information of INF-DDS-A.

Finally the Management Agent forwards the device dependent service information DDS-A and DDS-B to the respective Auto configuration server ACS-A and ACS-B, respectively.

Hereby it has to be explained that also in the downstream direction the respective Auto configuration servers, ACS-A and ACS-B, communicates only with its associated part of the device dependent services DDS, respectively, DDS-A and DDS-B, via the common Management Agent MA, and via the associated device independent services DIS, respectively DIS-A and DIS-B, and via the common Native Service Management NSM that further forwards the configuration values towards the associated device dependent services, respectively, DDS-A and DDS-B, for configurations of its device dependent service parameters.

So, the different parts of device dependent service information INF-DDS-A and INF-DDS-B is communicated in both directions whereby each respective auto configuration server ACS-A and ACS-B is enabled to configure its associated part, respectively, DDS-A and DDS-B, of device dependent services DDS. However, Auto configuration server ACS-A is not able to configure parameters related to DDS-B, nor vice versa.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention, as defined in the appended claims.

The invention claimed is:

1. A method to configure Device Dependent Services of a device at a Customer Premise Equipment by a remote Auto-Configuration Server, said device further having Device Independent Services on top of a Service Platform, comprising:
   configuring said Device Dependent Services for configuration by a plurality of Auto-Configuration Servers, the configuring step being realized by,
      exporting Device Dependent Services on top of said Service Platform towards a Native Service Management, the native service management being one of said Device Independent Services, and
      splitting said Device Dependent Services of said Native Service Management into different parts, each part being associated with a distinct Device Independent Service and each Device Independent Service being visible to only one of said Auto-Configuration Servers coupled thereto via a common Management Agent.

2. A device at a Customer Premises Equipment comprising Device Dependent Services to be configured by a remote Auto-Configuration Server, said device further comprises Device Independent Services on top of a Service Platform, wherein said device to be configured by a plurality of Auto-Configuration Servers and comprising:
   a Native Service Management, which is one of said Device Independent Services, said Native Service Management including,
      a receiver part configured to receive device dependent service information of said Device Dependent Services; and
      a splitter part configured to split said device dependent service information into different parts, and to transmit each part to a distinct Device Independent Service;
   each distinct Device Independent Service being coupled via a common Management Agent among said Device Independent Services, to one of said plurality of Auto-Configuration Servers, such that only the respective part of said Device Dependent Services that is associated to said device dependent service information that is forwarded to the associated Device Independent Service becomes available for the associated Auto-configuration Server for respective configuration.

* * * * *